(12) United States Patent
Frumusa et al.

(10) Patent No.: US 6,788,399 B2
(45) Date of Patent: Sep. 7, 2004

(54) OPHTHALMIC ARTICLE INSPECTION SYSTEM

(75) Inventors: Gerald J. Frumusa, Rochester, NY (US); Thomas A. Brown, Avon, NY (US); Ronald D. Spoor, Penn Yan, NY (US); Joseph D. Blasiak, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/998,492

(22) Filed: Nov. 30, 2001

(65) Prior Publication Data

US 2003/0103201 A1 Jun. 5, 2003

(51) Int. Cl.[7] .................................................. G01B 9/00
(52) U.S. Cl. ........................................ 356/124; 356/127
(58) Field of Search ................................. 356/121–127, 356/445–446, 239.1–239.3; 250/223 R, 223 B; 382/141

(56) References Cited

U.S. PATENT DOCUMENTS

| | | | | |
|---|---|---|---|---|
| 3,746,450 A | * | 7/1973 | Smith, Jr. ..................... | 356/134 |
| 3,822,096 A | | 7/1974 | Wilms ......................... | 356/164 |
| 3,988,068 A | * | 10/1976 | Sprague ....................... | 356/124 |
| 4,988,274 A | | 1/1991 | Kenmochi ..................... | 425/174.4 |
| 4,998,819 A | * | 3/1991 | Labinger et al. .............. | 351/212 |
| 5,100,232 A | * | 3/1992 | Smith et al. .................. | 356/124 |
| 5,331,394 A | * | 7/1994 | Shalon et al. ................. | 356/124 |
| 5,443,152 A | | 8/1995 | Davis .......................... | 206/5.1 |
| 5,500,732 A | * | 3/1996 | Ebel et al. .................... | 356/124 |
| 5,529,728 A | | 6/1996 | Buazza ........................ | 264/1.38 |
| 5,574,554 A | | 11/1996 | Su ............................. | 356/124 |
| 5,627,638 A | | 5/1997 | Vokhmin ...................... | 356/124 |
| 5,717,781 A | * | 2/1998 | Ebel et al. .................... | 356/124 |
| 5,812,254 A | * | 9/1998 | Ebel et al. .................... | 356/124 |
| 5,818,573 A | * | 10/1998 | Lafferty et al. ............... | 356/127 |
| 6,259,518 B1 | | 7/2001 | Russell ........................ | 356/124 |
| 6,301,005 B1 | | 10/2001 | Epstein ........................ | 356/124 |
| 6,314,199 B1 | * | 11/2001 | Hofer et al. .................. | 382/141 |

* cited by examiner

Primary Examiner—Frank G. Font
Assistant Examiner—Sang H. Nguyen
(74) Attorney, Agent, or Firm—Katherine McGuire

(57) ABSTRACT

An assembly and method for inspecting ophthalmic lenses includes a light source and a 360° light structuring aperture configured to direct structured light toward an open center where a lens is positioned for imaging by an imaging device positioned beneath the assembly. The structured light is directed at the entire periphery of the lens and is internally reflected by the lens in the manner of a fiber optic conduit whereby the lens appears dark at clear areas of the lens. If there are defects or imprints on the lens, the internally reflected light will scatter at that point and appear as a bright spot to the imaging device.

25 Claims, 6 Drawing Sheets

OPHTHALMIC ARTICLE INSPECTION SYSTEM

BACKGROUND OF THE INVENTION

The present invention relates to machine inspection of transparent, shaped articles of manufacture such as contact lenses or intraocular lenses, for example. More specifically, the present invention relates to a novel machine inspection system for detecting defects in a lens.

Inspection devices and methods for detecting defects in an ophthalmic lens are known, some examples of which may be seen in the following patents:
U.S. Pat. No. 3,822,096 to Wilms et al on Jun. 2, 1974;
U.S. Pat. No. 5,443,152 to Davis on Aug. 22, 1995;
U.S. Pat. No. 5,574,554 to Su et al on Nov. 12, 1996; and
U.S. Pat. No. 6,301,005 to Epstein et al on Oct. 9, 2001.

The main purpose of an ophthalmic lens inspection system is to test the lens for defects such as cracking, chipping, warping, etc., which, if found, result in the lens having to be rejected and scrapped. In many prior art inspection systems, a light source is passed through the lens from one side (e.g., beneath the lens) and a camera, such as a CCD camera, is used to receive the light rays which have passed through the lens and thereby image the lens. In this method, the entire lens is lighted and seen as a bright spot to the camera while defects appear as dark spots. A computer may be used in conjunction with the camera to correlate pixels using algorithms which determine whether a lens has passed or failed inspection. This backlighting method of lens inspection is imperfect in that, by lighting the entire lens to the camera, particularly small defects tend to be overwhelmed by the high background signal and may therefore be missed by the inspection system.

In many of the prior art inspection systems which inspect hydrogel (soft) lenses, inspection is carried out while the lens is in the hydrated state. The lens is located for imaging by placing the lens in a holder with a saline or other solution. If a "wet-release" method of lens release from the contact lens mold is used, a wet lens inspection is then necessary, however, this method of lens inspection has drawbacks. In many of the prior art methods of wet lens inspection, the lens must be placed in a vessel together with a quantity of solution (usually saline) wherein the lens is held during inspection. This creates problems in being able to precisely locate and hold the lens steady during imaging of the lens. This is because with the lens in a solution, it is able to freely move about in the vessel and may become off-center or ride up the wall of the vessel. If this happens, the imaging device will not be lined up correctly with the lens and will read the image received as a "fail", resulting in many false-fail occurrences. Furthermore, in order for the lens to be imaged, a light source must pass through the lens which necessitates its holder, i.e., the vessel and solution, be able to correctly orient the lens and transmit light therethrough in a manner which does not distort the imaging of the lens. These factors, which must be considered when imaging a wet lens, result in added steps and cost to the manufacturing process.

In lens manufacturing systems which include a dry release of the lens from its mold, the lens may be inspected while still in the dry state. This provides the advantage of not having to keep the lens in solution during imaging which presents difficulty in correctly orienting the lens for imaging as discussed above. In many prior art inspection systems utilizing a dry lens inspection, the back-lighting method of lens inspection is used wherein the light source is directed from beneath through the lens where a camera placed above the lens picks up the light and analyzes the image for defects. While this method may provide the benefit of better control over being able to correctly orient the lens for imaging, this method still suffers from the limitations of detecting all defects using a light source which passes from beneath the lens from the convex side to the concave side thereof.

SUMMARY OF THE INVENTION

The present invention provides a lens inspection system which images a lens, preferably while the lens is in the dry state (i.e., it has not yet been hydrated), using a source of structured light which is directed at the full periphery of the lens edge. As such, the structured light travels through the lens in the same manner as a fiber optic conduit wherein the light is totally internally reflected by the lens, finally exiting the lens at the edge thereof directly opposite the point of light entry. As such, defect-free areas of the lens appear as extremely low contrast areas on the image detector. Conversely, defects in the lens cause the internally reflected light to scatter, thereby exiting the lens at the surface corresponding to the location of the defect and causing a bright, high contrast area spot on the image detector.

DETAILED DESCRIPTION

Figure 2:
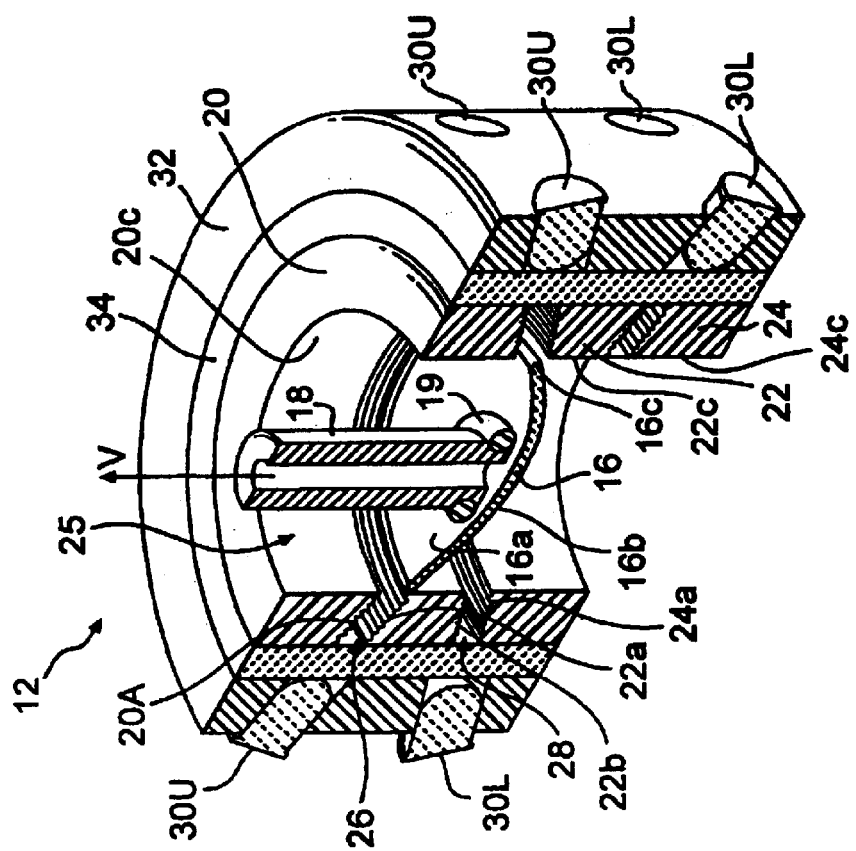
FIG. 2 is a cross-sectional perspective view of the lighting module as taken generally along the line 2—2 of FIG. 1 (the parts of the lighting module which are not shown in FIG. 1 are shown in FIG. 2)
Figure 1:
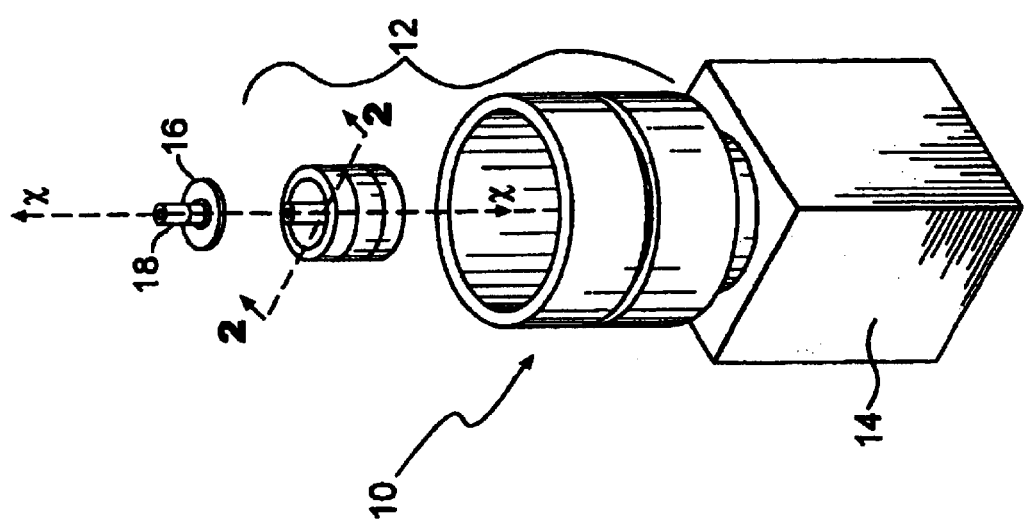
FIG. 1 is a perspective view of a first embodiment of the inspection assembly of the present invention with certain parts of the lighting module not shown for clarity.

Referring now to the drawing, there is seen on FIGS. 1 and 2 a first embodiment of a lens inspection system designated generally by the reference numeral 10 having a lighting module 12 and an image pick-up device 14. As discussed in detail below, lens inspection system 10 is able to detect defects or other markings (hereinafter collectively referred to as "markings") in an optical lens such as a contact lens 16, although it is understood that system 10 may be used for inspecting any type of transparent article including intraocular lenses and spectacle lenses, for example. It is furthermore noted that the word "markings" as used herein includes any type of mark on the lens under inspection, whether intentionally placed or not. Examples of intentionally placed markings include toric or rotational markings, inversion indicators, manufacturer's identifying marks, etc.

In a preferred arrangement of inspection system components, lighting module 12 is positioned above the imaging device 14 (e.g., a CCD camera) in a substantially vertically spaced relationship as seen in FIG. 1, although other component arrangements may be used as desired and are within the scope of the invention. The basic operation of inspecting system 10 involves: (1) picking a lens 16 with a holder such as a pick-and-place vacuum head 18; (2) positioning the lens 16 while attached to the head 18 inside the lighting module 12; and (3) activating the light source within the lighting module 12 with the imaging device directed at the lens. As explained more fully below, defects in the lens will show up as bright spots by imaging device 14 and a "pass" or "fail" score is allotted to the lens. In this regard, it is noted that a computer (not shown) may be used in conjunction with inspection assembly 10 to calculate a fail or pass condition based on predetermined threshold values which are compared with the measured image data received from the imaging device 14. Other peripheral handling devices, for example those which cause the lens to be passed to different locations based on its pass or fail score, may also be utilized in a full lens manufacturing environment. Such peripheral handling devices, whether upstream or downstream of the lens inspection station described herein, may be used and designed according to the desires of the user and will therefore not be explained in detail here.

As seen in FIG. 2, lighting module 12 is of a generally circular configuration having upper, middle and lower aperture blocks 20, 22 and 24, respectively, which define a central opening 25. The upper and middle aperture blocks 20 and 22 are spaced from each other to define an upper light structuring aperture 26, and the middle and lower aperture blocks are spaced from each other to define a lower light structuring aperture 28, with the upper and lower light structuring apertures 26 and 28 each extending a full 360° about central opening 25. In this regard, it is noted that, depending on the intensity of the lighting source used, upper light structuring aperture 26 may alone be sufficient to achieve a sufficient inspection of the lens 16, in which case lower light structuring aperture 28 would not be necessary.

As seen best in FIG. 2, the facing surfaces 20a and 22a of the upper and middle aperture blocks 20 and 22, respectively, are textured with a series of parallel grooves which function to eliminate light rays which are not at the correct angle for lens inspection, as will be discussed further below. Likewise, facing surfaces 22b and 24a of the middle and lower aperture blocks 24 and 26, respectively, are textured for the same reason, i.e., to eliminate light rays which are not at the correct angle for lens inspection. Also, although not shown in FIG. 2, the inner cylindrical walls 22c, 24c and 26c of the upper, middle and lower aperture blocks, respectively, may be provided with texturing to eliminate glare off these surfaces. Further discussion of the individual functionality of the upper and lower light structuring apertures 26 and 28 is provided below.

Figure 8A:
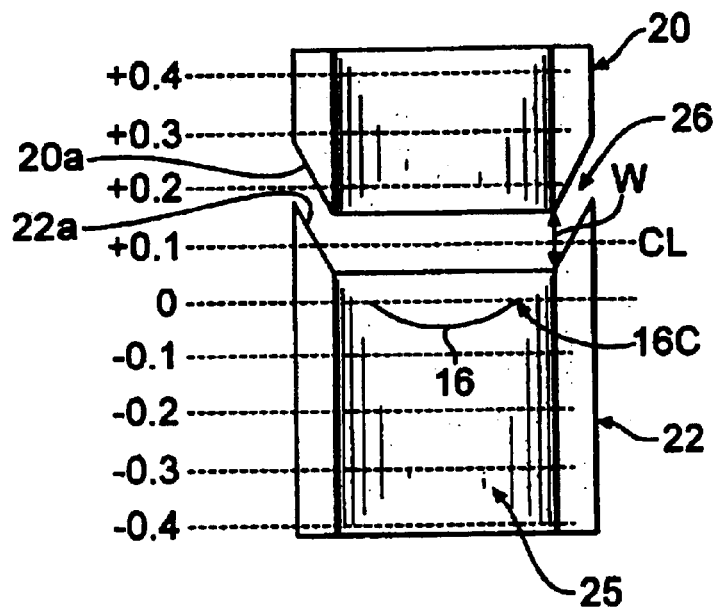
FIG. 8a is a cross-sectional view of FIG. 2 showing the upper and middle aperture blocks.
Figure 8B:
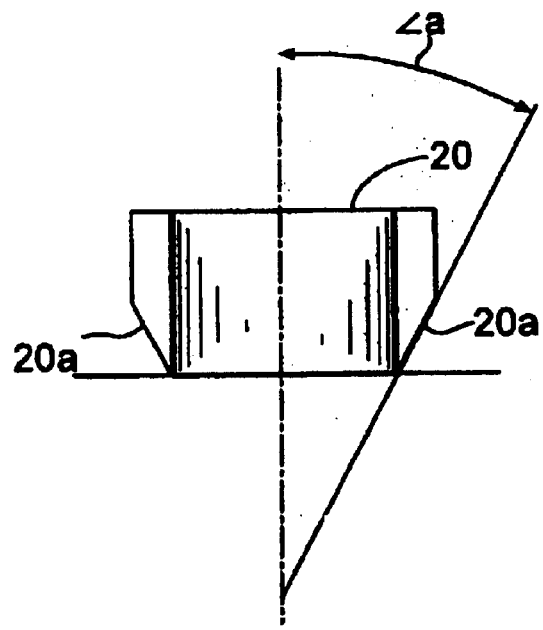
FIG. 8b is the view of FIG. 8a showing only the upper aperture block.

Discussion is directed first to the functionality of the upper light structuring aperture 26 (see also FIGS. 8a and 8b). A light source is provided to deliver light about the full 360° perimeter of the upper and middle aperture blocks 20 and 22 whereby the upper aperture 26 acts to structure the light which is directed into central opening 25. In the embodiment of FIGS. 1 and 2, the light source is in the form of a plurality of annularly spaced LEDs 30U arranged in an outer ring 32 about upper aperture 26, although it is understood that any suitable light source may be used which accomplish the objectives of the present invention. Other types of suitable light sources include incandescent light bulbs and a 360° fiber optic light source (see item 44 in FIG. 3), for example.

A light diffuser 34 is provided between LEDs 30U and light structuring aperture 26 which acts to substantially evenly diffuse the light emitted by the LEDs (or other light source) prior to the light being structured as it passes through aperture 26 into central opening 25. Light diffuser 32 is formed as a ring in the embodiment of FIGS. 1 and 2 although other configurations are possible. A material from which diffuser 32 may be formed is a clear plastic such as acrylic, for example.

Lens 16 may be held by a pick-and-place head 18 which engages the lens by drawing a vacuum "V". A soft O-ring 19 may be attached to the lens-engaging end of the head 18 so as to prevent damage to the delicate lens 16. It is preferred that head 18 pick lens 16 by engaging the concave side of the lens 16a whereupon lens 16 will be introduced into central opening 25 in a concave side-up position. Head 18 is movable along a vertical axis x-x (FIG. 1) between a raised position seen in FIG. 1, and a lowered position seen in FIG. 2. Thus, a lens 16 which has been engaged by head 18 is lowered into central opening 25 of the lighting module 12 and is positioned for inspection as seen in FIGS. 2 and 8a. When in the "inspection position", the outside, peripheral edge 16c of lens 16 is positioned along the path of incoming structured light rays from upper light structuring aperture 26.

Once a lens 16 is in the inspection position as described above, the light source is activated which delivers structured light through aperture 26 in the manner described above. The structured light strikes outside edge 16c of the lens 16 whereby the lens behaves in the same manner as a fiber optic conduit, i.e., light from aperture 26 is directed at and enters the lens at the peripheral edge 16c thereof and internally reflects off the inside of the opposite concave and convex lens surfaces 16a and 16b before finally exiting at the edge of the lens opposite the point of the applicable light ray entry. In this regard, it is seen best in FIGS. 8a and 8b that the facing surfaces 20a and 22a of the upper and middle aperture blocks 20 and 22, respectively, are beveled to angle downwardly such that the direction of light rays directed therethrough are oriented to impinge the edge 16c of the contact lens 16 in the direction of the lens curvature. In a preferred embodiment, bevel angle "a" as shown in FIG. 8b is between about 10° to 50°. Thus, light rays that pass substantially parallel to the angle of aperture 26 are the "structured light rays" referred to herein. Light rays not at this structured angle are stopped by the texturing provided on the aperture block surfaces 20a and 22a.

Figure 6:
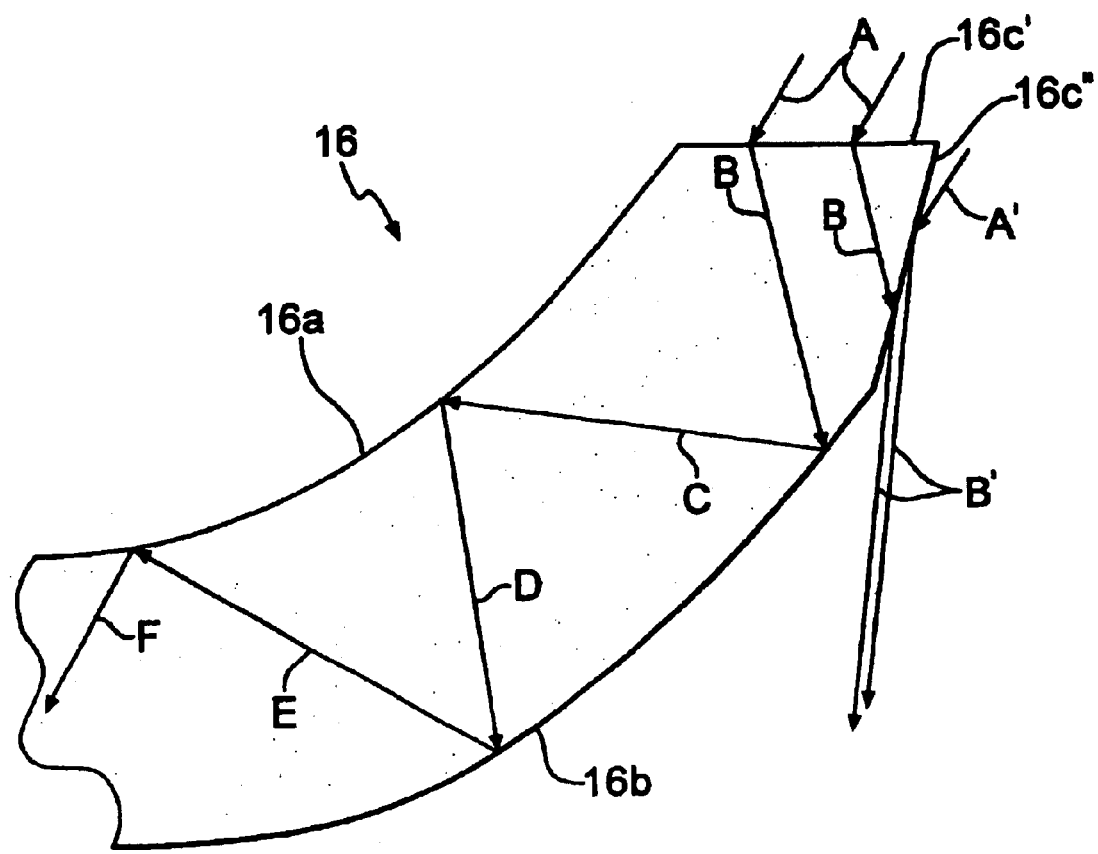
FIG. 6 is an enlarged, cross-sectional view of a representative lens having no defects present and showing expected ray traces therethrough when using the present inspection system.
Figure 6:
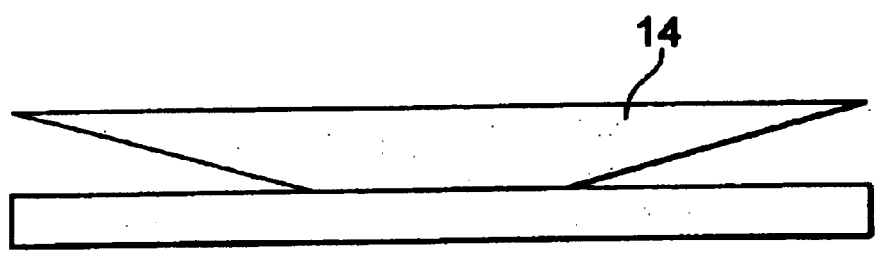

FIG. 6 illustrates ray traces through a lens 16 section having no markings. Here, structured light rays A impinge lens edge surface 16c' and are refracted at surface 16c' with the refracted rays labeled B wherein the angle of refraction equals the angle of incidence. Light rays B strike lens surface 16b and again reflect along ray c. So long as no markings are present, internal reflection continues along rays D, E, and F, etc., until these rays finally exit the lens at the opposite peripheral edge.

The underlying principals are the same principals of physics that make a fiber-optic cable work. Light ray A enters the edge of the lens 16c, and the difference in density between the lens material and the surrounding air is large; therefore, the laws of refraction are at work. The principal of refraction prevents the light ray from refracting through the surface of the contact lens and escaping into the surrounding air. This is because the angle between the light ray and the surface of the lens material does exceed the critical angle for reflection. The light ray is instead reflected back inside the contact lens material. The light ray is then reflected off the opposite internal lens surfaces 16a and 16b. The angle of reflection will equal the angle of incidence. All light reflects back and forth between the anterior and posterior surfaces 16a and 16b of the contact lens until it exits at the opposite edge (not shown). The camera 14 sees no light; therefore, clear areas of the contact lens appear dark in the image.

While clear areas of the lens appear dark, the peripheral edge 16c of the lens appears bright. This is because at the edge of the lens 16", the lens surface geometry causes both reflection and refraction of light in the direction of the camera 14 as indicated by rays B'.

Figure 7:
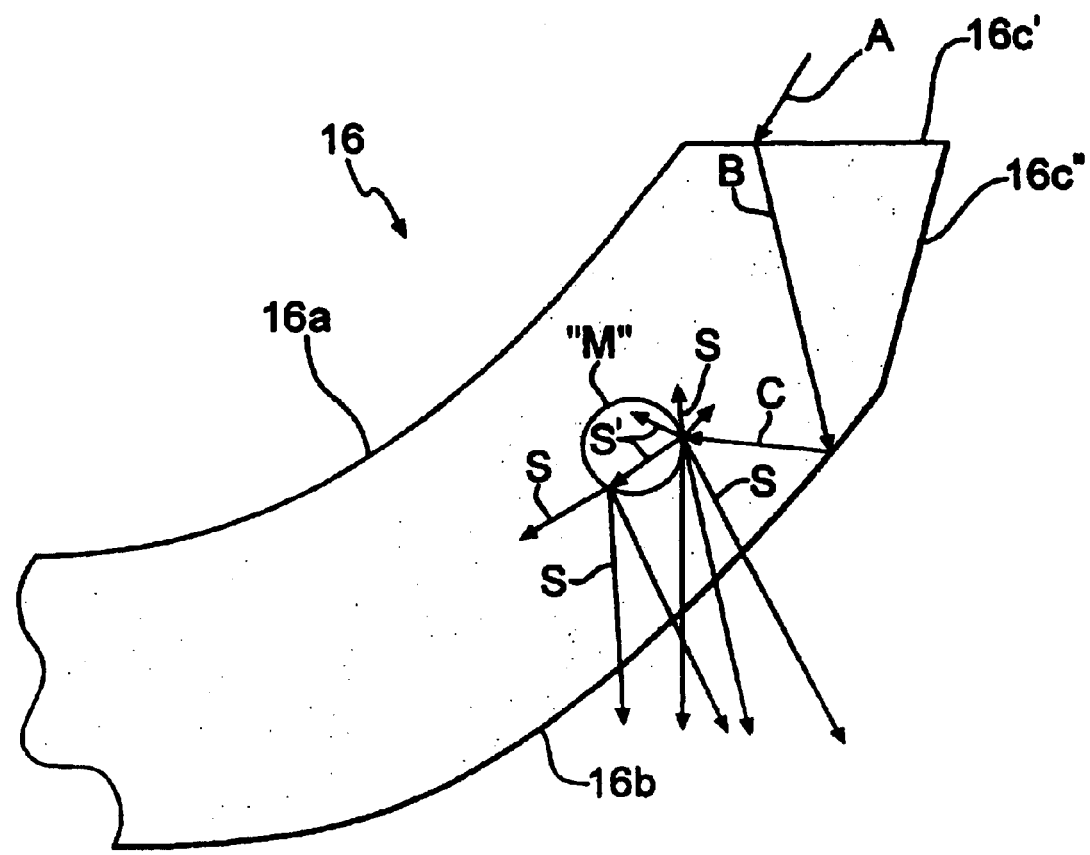
FIG. 7 is the view of FIG. 6 except the representative lens includes a defect.
Figure 7:
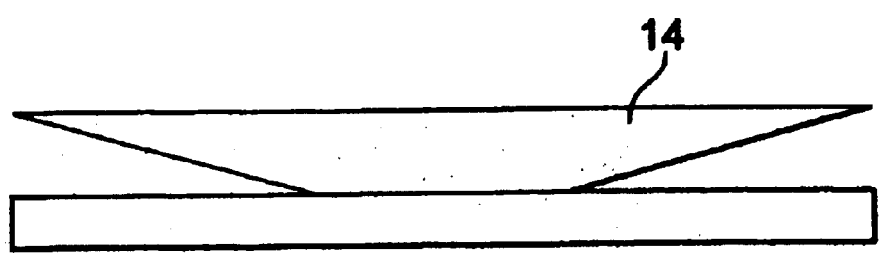

Referring to FIG. 7, the case of markings "M" on the lens 16, the internally reflected light ray C scatters along rays S and S' and exits the lens at the point of defect/imprint. The light scatters since it is reflected by the reflective surfaces present in the marking and also refracted (rays S') due to the difference in density between the lens material and the marking. As such, the "not clear" areas of the lens where there are markings on the lens will appear as bright spots to imaging device 14 whereas the "clear" areas where there are no defects/imprints will appear dark.

As stated in the Summary of the Invention, this present method of lens imaging for inspection is far superior at revealing the "not clear" areas of the lens than are the prior art inspection methods which direct light through the lens from the concave to the convex surfaces thereof. In the prior art methods, light passes completely through the lens at the clear areas of the lens while the marking areas of the lens block the light and thus appear dark. As such, many markings do not appear on the imaging device due to being "overwhelmed" by the light passing through the "clear" areas of the lens, thereby leading to a false "pass" inspection of the lens.

Once the lens 16 has been imaged by imaging device 14, the light source may be deactivated until the next lens is in the inspection position. Alternatively, the light source may remain activated between lens inspections, as desired.

As mentioned above, the upper light structuring aperture 26 may alone be sufficient to adequately image and inspect the lenses; however, due to the presence of the pick-and-place head 18 at the center of the lens 16, the area of the lens "inside" the o-ring 19 may be blocked from being able to give an accurate representation of markings in this area. In such a case, lower light structuring aperture 28 is used immediately following imaging of the lens at upper light structuring aperture 26.

More particularly, once lens 16 has been imaged at upper aperture 26, the upper LED array 30U is deactivated. With the central part of the lens convex side 16b aligned with lower light structuring aperture 28, lower LED array 30L is activated which directs light through diffuser 34 and through lower light aperture 28. If necessary, pick-and-place head 18 may be re-positioned within central opening 25 until the lens is in the right position. The facing surfaces 22b and 24a of the middle and lower aperture blocks are also beveled to angle upwardly to direct light toward the convex surface of the lens 16b which illuminates the area of the lens inside O-ring 19, thereby giving an image of this area of the lens to imaging device 14. This image is analyzed along with the image received from upper aperture 26 by a computer (not shown) attached to inspection system 10 and provides a single "pass" or "fail" result based on the results of the upper and lower aperture images.

Figure 3:
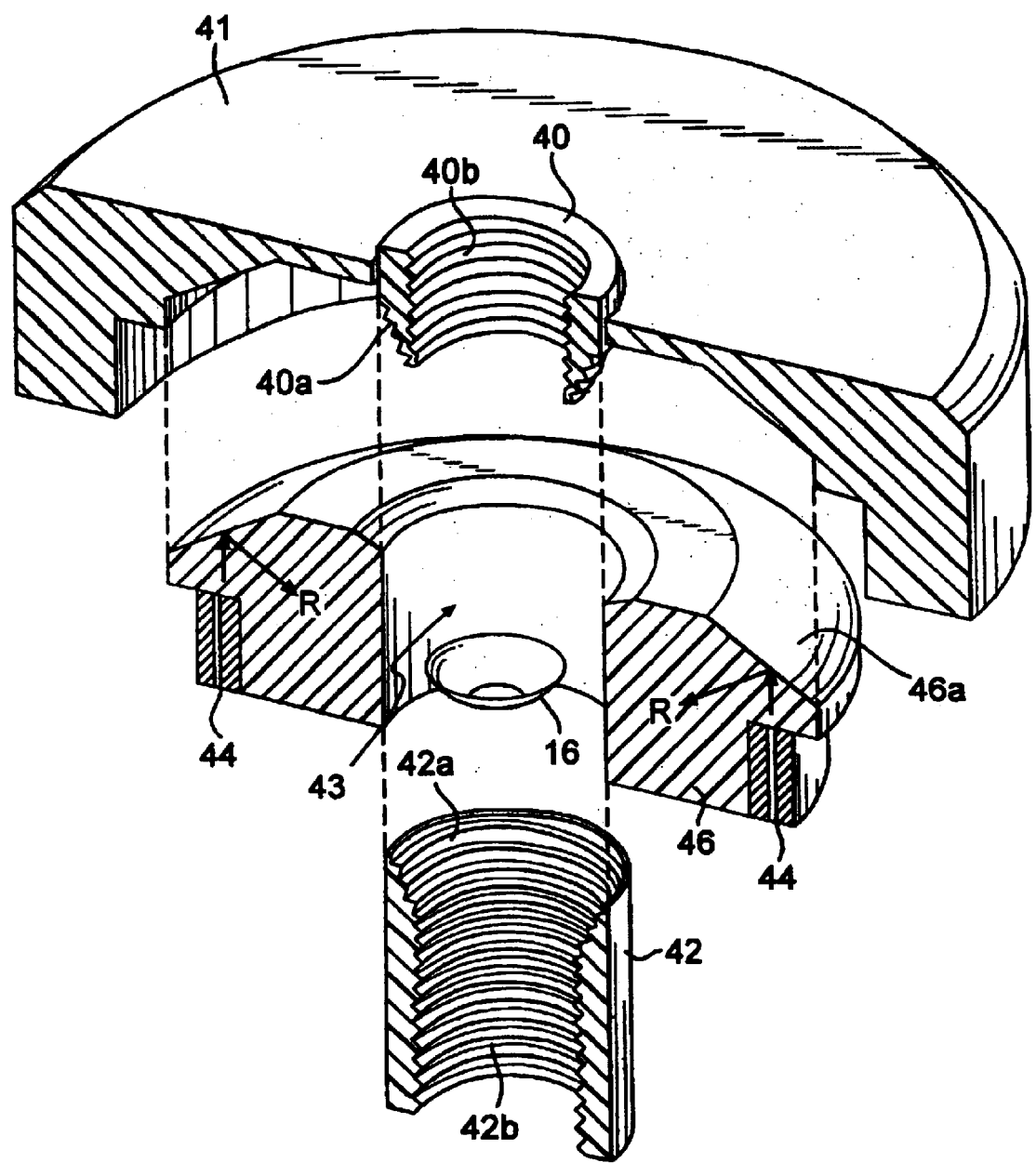
FIG. 3 is an exploded perspective view of a second embodiment of the lighting module with certain parts not shown.

Attention is now turned to FIG. 3 which shows selected components of a second embodiment of the lighting module. In this second embodiment, only one light structuring aperture is provided by an upper aperture block 40 held in an upper housing cap 41, and a lower aperture block 42 (the lower housing cap in which block 42 is mounted is not shown) which, when fully assembled, are spaced to form a single light structuring aperture defined by facing angled walls 40a and 42a which direct light into central opening 41 to image lens 16. Thus, the arrangement and function of aperture blocks 40 and 42 in this second embodiment are substantially the same as the arrangement and function of the upper and middle aperture blocks 20 and 22 described above. It is furthermore noted that the angled surfaces 40a, 42a of upper and lower aperture blocks 40,42 are textured, as are inner cylindrical walls 40b,42b to prevent glare and spurious rays from passing through the apertures.

In this second embodiment, the light source is in the form of a 360° fiber optic light 44 which is placed in surrounding relationship to light diffuser 46. As seen in FIG. 3, light diffuser 46 may include beveled surfaces such as at 46a which act as an internal light reflector to direct light from source 44 along directional arrow "R" through the aperture formed between the facing surfaces 40a and 42a of the aperture blocks 40 and 42 when fully assembled, respectively. Thus, in this instance, diffuser 46 is acting as both a diffuser and a reflector. It is noted that a diffuser having surfaces configured to provide internal reflection is optional and may be used to increase or adjust the light intensity for inspection of lens 16. Also, if needed or desired, the reflecting surfaces of the diffuser may have a reflecting coating applied thereto to even further increase the light intensity.

Figure 4:
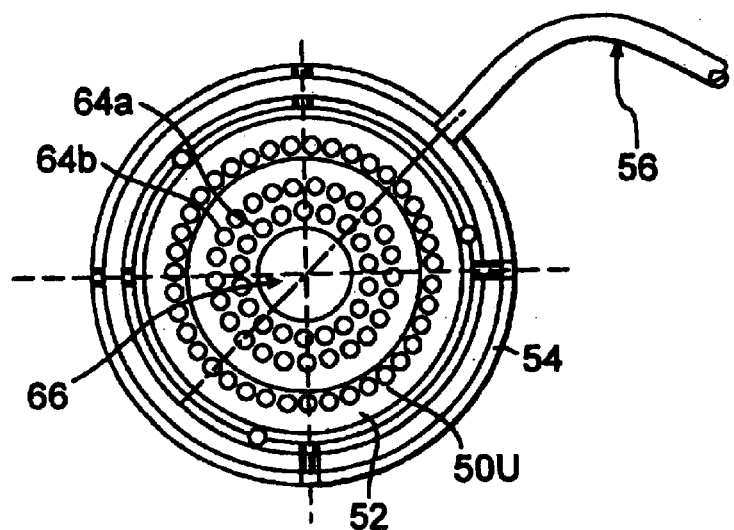
FIG. 4 is a top plan view of the LED base of a third embodiment of the lighting module shown in FIG. 5.
Figure 5:
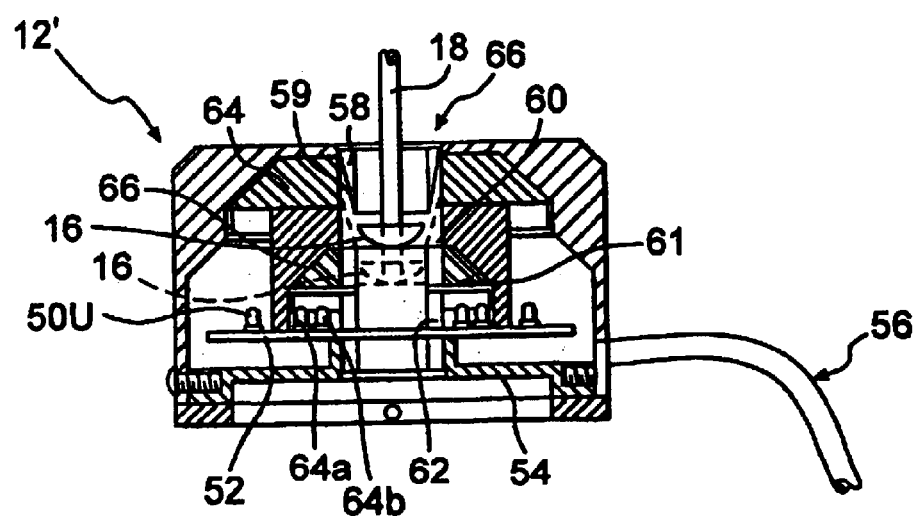
FIG. 5 is an elevational, cross-sectional view of a third embodiment of the lighting module.

Attention is now turned to a third embodiment of the inspection assembly as seen in FIGS. 4 and 5. The main difference between this embodiment and the first embodiment shown in FIGS. 1 and 2 is the placement of the LED arrays and the configuration of the light diffuser. More particularly, in the third embodiment of the inspection assembly 12', a first circular array of LEDs 50U are provided on a circular base 52 which is mounted to a housing base 54. Power cord 56 supplies power from a source (not shown) to the LED arrays. As in the first embodiment, the third embodiment includes upper, middle and lower aperture blocks 58, 60 and 62, respectively, which are placed in spaced vertical relation to define upper and lower light structuring apertures 59 and 61, respectively. An upper light diffuser 64 is positioned in surrounding relationship to upper aperture block 58 and upper light structuring aperture 59 wherein light from LED array 50U passes through upper diffuser 64, through light structuring aperture 59 to central opening 66.

A lens 16 is positioned adjacent light aperture 59 via pick-and place head 18 in the same manner as described with reference to FIGS. 1 and 2 and the lens image is received by an imaging device (not shown in FIG. 5) placed beneath assembly 12'. If needed, lower light structuring aperture 61 may be utilized to take a second image of the central part of the convex surface of the lens in the same manner as described with reference to the embodiment of FIGS. 1 and 2.

Thus, once an image has been taken using the upper aperture 59, upper LED array 50U is deactivated and head 18 is lowered to position the convex part of the lens adjacent lower light structuring aperture 61 as shown in dotted lines in FIG. 5. A lower LED array 64a and 64b is activated which directs light to a lower light diffuser 66 and through lower light structuring aperture 61 to the convex surface of the lens. This image is received by the imaging device and combined with the first image taken with the upper light aperture to determine whether the lens passed or failed inspection. It is noted that although two separate upper and lower diffusers are shown in this embodiment, it is understood that they may be combined into a single diffuser is desired. It is also noted that the upper and lower diffusers may be provided with angled and/or coated surfaces as shown similar to surface 46a of the embodiment of FIG. 3 to both diffuse and reflect light from the LED arrays to the light apertures.

Lastly, in a preferred embodiment of the invention, the aperture blocks are vertically movable relative to each other about a central axis x-x to permit the width "w" (FIG. 8a) of the corresponding aperture to be increased or decreased as desired. It will be appreciated that the aperture width "w" defines the corresponding width of the structured light passing through to the lens whereby the dimension of the structured light may be finely adjusted to achieve the best imaging possible. In this regard, it is noted that lenses of varying curvatures and/or sizes may be inspected using the present invention by adjusting the aperture blocks vertical positioning. It is furthermore noted that should the aperture angle need to be changed to accommodate a particular lens curvature, the user may simply remove the existing aperture blocks and replace them with another aperture block set having the desired angulation at the facing surfaces which define the aperture. Thus, multiple sets of aperture blocks may be provided having a range of aperture angulations to accommodate an equal range of lens configurations.

While the invention has been shown and described with reference to three embodiments thereof, it is understood that other variations in overall assembly design may be made without departing from the full spirit and scope of the invention as defined by the claims which follow.

What is claimed is:

1. A method of inspecting an ophthalmic lens having a 360° peripheral edge, comprising the step of directing structured, diffuse light at the entire 360° peripheral edge of the lens such that the structured light enters the lens only at the peripheral edge thereof and internally reflects within the lens, and wherein the internally reflected light diffracts upon encountering a marking on the lens, whereby clear areas of the lens appear dark due to said internal light reflection, and one or more markings on the lens appear bright due to said internally reflected light scattering and exiting the lens at said one or more markings.

2. The method of claim 1 and further comprising the step of imaging the lens with an imaging device during the inspection.

3. The method of claim 2 and further comprising the step of comparing the image received by the imaging device with a predetermined set of threshold values and determining whether the lens under inspection has passed or failed inspection.

4. The method of claim 3 wherein a computer is used in determining whether the lens under inspection has passed or failed inspection.

5. A method for inspecting an ophthalmic lens having a 360° peripheral edge, said method comprising the steps of:

a. providing a light source in an annular array;
   b. structuring and diffusing the light emitted by said light source into a 360° structured, diffuse light directed radially inwardly at a center;
   c. positioning an ophthalmic lens at said center such that said structured light is directed at the entire 360° peripheral edge of said lens whereby said structured light enters only at the peripheral edge of said lens with said lens behaving as a fiber optic conduit such that said structured light internally reflects along clear areas of said lens, and scatters at markings on said lens; and
   d. providing an imaging device directed at said ophthalmic lens, said imaging device receiving bright and dark signals from the ophthalmic lens with the bright signals indicating the position of one or more markings on the lens and dark signals indicating clear areas of the lens.

6. The method according to claim 5 wherein said light source is an LED array.

7. The method according to claim 5 wherein said light source is a fiber optic configured to emit a 360° ring of light.

8. The method according to claim 5 wherein the light is structured by a first, 360° light structuring aperture placed between said light source and said lens.

9. The method of claim 8 wherein said light structuring aperture is formed by spaced, facing surfaces of a first aperture block and a second aperture block.

10. The method of claim 9 wherein said facing surfaces are beveled to define an aperture angle.

11. The method of claim 10 wherein said angle is between about 10 to 50°.

12. The method of claim 9 wherein said facing surfaces are textured.

13. The method of claim 8, wherein said lens inspection includes opposite concave and convex surfaces, and further comprising the step of providing a second, 360° light structuring aperture placed between said light source and said lens, said second light structuring aperture positioned to direct light at the convex surface of said lens.

14. The method of claim 13 further comprising the step of providing a third aperture block, and wherein said second, 360° light structuring aperture is formed by spaced, facing surfaces of said second aperture block and said third aperture block, respectively.

15. An assembly for inspecting an ophthalmic lens, said assembly comprising:

a. a light source;
   b. an annular light structuring aperture located radially inwardly of said light source, said annular light structuring aperture having an open center and configured to structure light from said light source into 360° light rays which are directed radially inwardly to said open center;
   c. an annular diffuser positioned radially inwardly of said annular light structuring aperture for diffusing said structured light; and
   d. a lens holder for removably engaging and positioning said lens in said open center adjacent said light structuring aperture whereby the structured, diffuse light impinges upon said lens.

16. The assembly of claim 15, and further comprising an imaging device positioned to image said lens upon the structured light impinging upon the lens.

17. The assembly of claim 16, wherein said structured light enters the lens along the entire periphery of the lens and is internally reflected within the lens such that clear areas of the lens appear dark to said imaging device, and wherein the internally reflected light scatters at points of markings on the lens such that areas of the lens having markings appear as bright areas to said imaging device.

18. The assembly of claim 15 wherein said light source is an LED array.

19. The assembly of claim 15 wherein said light source is a fiber optic.

20. The assembly of claim 15 wherein said light diffuser is made of plastic.

21. The assembly of claim 15 wherein said diffuser includes surfaces for reflecting the light received from said light source toward said light structuring aperture.

22. The assembly of claim 15, and further comprising first and second aperture blocks having spaced, facing surfaces defining said light structuring aperture.

23. The assembly of claim 22, wherein said facing surfaces are textured.

24. The assembly of claim 22 wherein said spacing between said facing surfaces is continuously adjustable.

25. The assembly of claim 22 wherein said light structuring aperture has an aperture angle between about 100 and 50°.

* * * * *

UNITED STATES PATENT AND TRADEMARK OFFICE
CERTIFICATE OF CORRECTION

PATENT NO. : 6,788,399 B2
APPLICATION NO. : 09/998492
DATED : September 7, 2004
INVENTOR(S) : Gerald J. Frumusa et al.

It is certified that error appears in the above-identified patent and that said Letters Patent is hereby corrected as shown below:

Col. 10, line 7
replace "100"
with --10°--.

Signed and Sealed this

Twenty-sixth Day of June, 2007

JON W. DUDAS
*Director of the United States Patent and Trademark Office*